No. 793,900. PATENTED JULY 4, 1905.
F. A. NEWELL.
LOCK NUT.
APPLICATION FILED APR. 15, 1905.
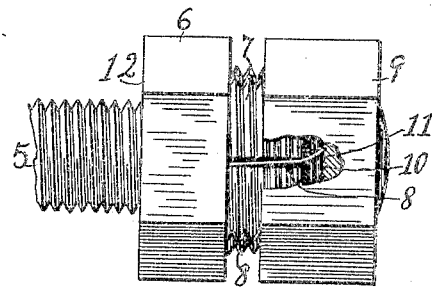
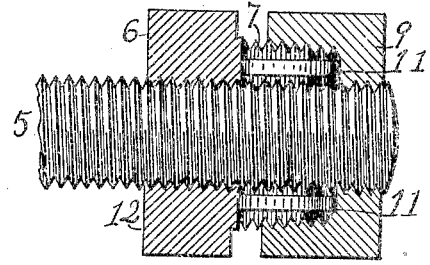
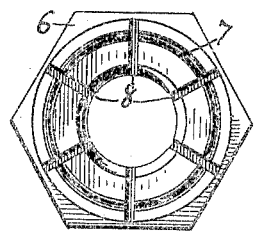 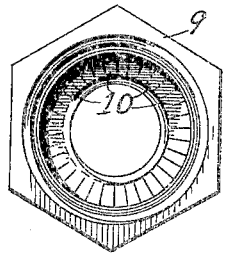
Witnesses
N Waller
E. Gray.
Inventor
Frank A. Newell.
by W. R. Stevens.
Attorney No. 793,900. Patented July 4, 1905.

UNITED STATES PATENT OFFICE.

FRANK A. NEWELL, OF FALLON, MONTANA.

LOCK-NUT.

SPECIFICATION forming part of Letters Patent No. 793,900, dated July 4, 1905.

Application filed April 15, 1905. Serial No. 255,747.

*To all whom it may concern:*

Be it known that I, FRANK A. NEWELL, a citizen of the United States, residing at Fallon, in the county of Custer and State of Montana, have invented certain new and useful Improvements in Lock-Nuts, of which the following is a specification.

This invention relates to that class of devices which are designed to prevent screw-nuts from being worked loose from their bolts when subjected to frequent or continuous jarring in service—such, for example, as the nuts which hold the bolts in the fish-plates of rails or the nuts in various positions on engines, cars, &c.; and its object is to bind the nut by friction upon the bolt and to lock the binding mechanism so that it cannot be worked loose without the application of force directly to the binder to turn it, and yet which may be turned loose with little injury to the binder when desired.

To this end my invention consists in the construction and combination of parts forming a lock-nut hereinafter more fully described and particularly defined in the claim, reference being had to the accompanying drawings, in which—

Figure 1 is a side view of a lock-nut according to my invention, a portion being broken away. Fig. 2 represents the same in longitudinal section. Fig. 3 is an end view of the nut to be locked, and Fig. 4 is an interior view of the locking-nut.

Numeral 5 represents a screw-threaded bolt.

6 represents the nut which is to be secured upon the bolt. The head portion of this nut is shown as six-sided; but it may have any suitable number of sides, screw-driver slots, spanner-holes, or other means for engagement by a wrench or other tool for turning it. The portion 7 of its body is a little tapering and is screw-threaded on its tapering surface with the same thread to the inch as the thread inside of it and the thread on the bolt. This tapering body 7 has radial longitudinal slots 8 through to its interior opening.

9 represents the binding-nut, bored and threaded to be screwed upon the bolt 5 and counterbored and threaded in at one end to receive the tapered portion 7 of the nut 6 at the same time that both of these nuts are screwed upon the bolt 5. The bottom of the counterbore has radial notches 10 to receive the projecting ends of braces 11, which are located in the slots 8. These braces may be made of flat wire or of narrow strips of stiff non-elastic material and narrow enough not to bind on the screw-threads and long enough to be pushed into the notches 10 just before the binding-nut comes to a solid bearing on the tapering body 7. Let us suppose that the nut 6 has been screwed to place with its face 12 firmly against the object it is to hold. Then by screwing the binding-nut 9 firmly upon the tapering body 7 the sections of that body will be bent inward, so as to grip the screw 5 immovably. At the same time the free ends of the strip 11 will have caught into the teeth 10, and as the nut continues to turn these once free ends will be bent backward and stand as braces against the teeth 10 to resist all tendency of the binding-nut to become unscrewed or loose by any amount of jarring. The nut 6 may also be thus rigidly secured at any point upon the bolt 5 to serve as a head or shoulder thereon for any purpose. Whenever it becomes necessary to remove one of these nuts, there must be sufficient force to turn the nut 9 applied backward against the braces 11, so as to break them off or crimple them backward. Their cost is too little to be considered. With properly-fitted nuts 6 and bolts 5 the inward spring of the body-segments 7 is almost immeasurable, so that the loose fit of the braces 11 in the slots 8 would never prevent this binding. This device is so complete a lock to the nut that if the nut 9 be screwed home with the usual force of such work the nut 6 will be so rigidly clamped upon the screw 5 that the latter could be twisted off before nut 6 would slip on it by a direct attempt to turn nut 6 loose.

Having thus fully described my invention, what I believe to be new, and desire to secure by Letters Patent, is the following:

In lock-nuts, two nuts internally threaded to fit upon a screw; one of these nuts being externally tapered and screw-threaded for a portion of its length and having radial slots longitudinally through the same portion;
5 the other nut being counterbored and screw-threaded to receive and bind upon the aforesaid tapered portion, and having radial notches in the bottom of the counterbore; and brace-pieces located in the said slots to engage the said radial notches and lock the 10 binding-nut, substantially as described.

FRANK A. NEWELL.

Witnesses:
  N. S. WALLER,
  E. GREY.